(12) United States Patent
Westwood et al.

(10) Patent No.: US 7,863,364 B2
(45) Date of Patent: Jan. 4, 2011

(54) PROCESS FOR MAKING DYNAMICALLY-LOADED ARTICLES COMPRISING PROPYLENE-BASED ELASTOMERS, COMPOSITION FOR USE IN SUCH PROCESSES, AND ARTICLE MADE USING SUCH PROCESSES

(75) Inventors: Alistair Duncan Westwood, Kingwood, TX (US); Abdelhadi Sahnoune, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 1000 days.

(21) Appl. No.: 11/635,332

(22) Filed: Dec. 7, 2006

(65) Prior Publication Data

US 2007/0167553 A1 Jul. 19, 2007

Related U.S. Application Data

(60) Provisional application No. 60/759,595, filed on Jan. 17, 2006.

(51) Int. Cl.
*C08K 3/26* (2006.01)

(52) U.S. Cl. .............. 524/397; 524/426; 524/427; 524/451; 474/191; 474/264; 474/271

(58) Field of Classification Search .......... 524/397, 524/426, 427, 451; 474/191, 264, 271
See application file for complete search history.

(56) References Cited

U.S. PATENT DOCUMENTS

| 4,207,373 | A | 6/1980 | Segal | 428/251 |
|---|---|---|---|---|
| 5,610,217 | A | 3/1997 | Yarnell et al. | 524/397 |
| 5,698,650 | A | 12/1997 | Jourdain et al. | 526/283 |
| 6,288,171 | B2 | 9/2001 | Finerman et al. | 525/192 |
| 6,525,157 | B2 | 2/2003 | Cozewith et al. | 526/348 |
| 6,635,715 | B1 | 10/2003 | Datta et al. | 525/240 |
| 6,737,461 | B2 * | 5/2004 | Hannay et al. | 524/397 |
| 2002/0082328 | A1 | 6/2002 | Yu et al. | 524/423 |
| 2005/0107534 | A1 | 5/2005 | Datta et al. | 525/191 |

FOREIGN PATENT DOCUMENTS

| EP | 0 308 286 | 3/1989 |
|---|---|---|
| EP | 0 969 043 | 1/2000 |
| EP | 1 003 814 | 5/2000 |
| EP | 1 239 004 | 9/2002 |
| EP | 1 607 440 | 12/2005 |
| GB | 1 134 422 | 11/1968 |
| WO | WO 97/22662 | 6/1997 |
| WO | WO 99/07788 | 2/1999 |
| WO | WO 00/69966 | 11/2000 |
| WO | WO 02/051634 | 7/2002 |
| WO | WO 02/053629 | 7/2002 |
| WO | WO 03/040201 | 5/2003 |
| WO | WO 2005/049670 | 6/2005 |
| WO | WO 2006/044149 | 4/2006 |

* cited by examiner

*Primary Examiner*—Bernard Lipman

(57) ABSTRACT

The invention relates to a process for making an article subject to dynamic loading, the process comprises: (i) shaping a polymer-containing composition in the green state, the composition comprising (a) a continuous phase of a polymeric component of at least 15 wt %, based on the total weight of the polymer component of a propylene elastomer having a heat of fusion of less than 70 J/g and an isotactic triad tacticity of 50 to 99% and optionally containing units derived from a diene, the polymeric component having a density of less than 0.9 g/cm$^3$ and (b) from 20 to 120 phr, preferably 30 to 100 phr, most preferably 40 to 90 phr based on the total weight of the polymer component of a reinforcing filler component; and (c) a peroxide curative. The composition is combined with a fibrous reinforcement which is then cured to a cure state as determined by ODR @ 170° C., 30 min MH-ML of from 5 to 80 dNm. The invention especially relates to such processes when providing under Demattia testing conditions a crack length of less than 15 mm at room temperature over 90K cycles, preferably 10 mm, more preferably 7 mm, and most preferably 4 mm, and a 10% modulus of 0.7 to 10 MPa, preferably 1.4 to 9 MPa and most preferably 2 to 8 MPa.

28 Claims, 3 Drawing Sheets

PROCESS FOR MAKING DYNAMICALLY-LOADED ARTICLES COMPRISING PROPYLENE-BASED ELASTOMERS, COMPOSITION FOR USE IN SUCH PROCESSES, AND ARTICLE MADE USING SUCH PROCESSES

CROSS REFERENCE TO RELATED APPLICATIONS

This application claims the benefit of Provisional Patent Application No. 60/759,595, filed Jan. 17, 2006.

FIELD OF THE INVENTION

This invention relates to processes for making dynamically-loaded articles comprising propylene-based elastomers, to compositions used in performing such processes, the use of certain polymers for such compositions and processes, and to the final article made by such processes. The invention is especially applicable in cases where the target end use involves articles subject to high mechanical stresses at high frequency.

GENERAL BACKGROUND OF THE INVENTION

The term "dynamically-loaded articles" is used herein to indicate articles subject to dynamic loads in use but obviously also includes such articles at rest while not actually subject to dynamic loading. The term "article" refers to an object intended for use as a force transmitting component in a mechanical assembly and excludes cured test samples, such as test plaques of dumbbells used to exemplify cured properties of prior art materials by standard defined test methods. Dynamic loading may result from the application of changing and periodic loads to, for example, power transmission belts. Dynamically-loaded articles may be subjected to elastic deformation in compression.

In the case of belts, high-dynamic stresses may be inflicted. The belt may need to resist multi-axial deformation and have adequate wear resistance as the belt travels around pulleys etc. The performance of dynamically-loaded articles depends on a combination of A) mass of the article needed to handle the loads to which it is exposed and B) the longevity in its working environment. Reference is made herein to the "power density" that is to say the amount of power that can be handled by a unit mass of the article.

One way of increasing the power density is to add a "non-fibrous reinforcing filler material" to the polymer used in the manufacture of such articles. A generally used, non-fibrous reinforcing filler is carbon black. Examples of other such filler materials include talc, silicates, clay, platelets, etc. Fillers can increase the capacity for accommodating compressive and extensional loads. The filled polymeric composition stiffens and can become more difficult to process. Another way of increasing the power density is to add fibrous reinforcement in the form of fabrics or cords or as filler-like material, such as chopped fiber, dispersed through the polymer composition.

Yet another way of increasing the power density and the ability of the article to withstand higher temperatures is to crosslink the polymer used for the composition. The cross-linking can be performed using a vulcanization step (conventionally with a sulfur or peroxide curing agent or package) that establishes covalent links between the polymer chains. Cross-linking increases the stiffness as measured by the modulus, thereby increasing the power density. But, at the same time the cross-linked composition may become more brittle and prone to cracking, limiting to the longevity of the article. The degree of cross-linking is often determined by reference to the "total cure state". As used herein the "cure state" refers to the cumulative effect of covalent and ionic crosslinking and is determined using a Mooney based test described herein.

Peroxide curing is used for more demanding high temperature applications. Peroxide curing uses a free radical mechanism that established direct covalent links between the polymer backbones. The chemical entities that cause curing also tend to attack backbone chains containing tertiary carbon atoms resulting from the incorporation of monomer components derived from higher alpha-olefins such as propylene. The links tend to be more temperature resistant (for applications used in environments above 120° C.) but more rigid. Peroxide cross-linking is possible without the presence of unsaturated moieties in the polymer backbone but may be accelerated by the presence of such moieties.

Cross-linking can also be provided by ionic bonds using what is termed in the art as a "coagent" such as zinc diacrylate, methacrylate or dimethyl acrylate or other component that establishes ionic cross-links between the ingredients of the compositions, especially in the case of peroxide cured articles. Such co-agents are believed to crosslink to some degree during the use of the article to compensate for any breakdown in cross-linking from the original curing step.

While dynamically-loaded articles may be produced in different ways, the embodiments disclosed herein relate especially to processes suitable for making dynamically-loaded articles capable of handling high load levels which are made using polymer containing compositions and reinforcing fillers and that are crosslinked. The embodiments hence relate more particularly to processes in which polymer and reinforcing filler containing compositions are first A) shaped in a green state (that is to say the uncured state) and secondly B) cured subsequent to shaping to form the article. The term "non-fibrous reinforcing filler" is used herein to indicate particulate material mixed with the polymer to be dispersed through the polymer. Generally, the reinforcing filler is mixed homogeneously with the polymeric component.

In such processes, the power density of the article overall can be further increased by applying the polymer and reinforcing filler containing composition to a fibrous reinforcement in the course of shaping the article in the green state. Such reinforcement is generally fibrous in nature (such as a filament bundle or fibrous web or fabric) or a fibrous, filamentary material such as chopped fiber. Examples are aramid fiber cords, fabrics or staple fiber webs embedded in or layered with the polymer containing composition. The fibrous reinforcement increases the ability to withstand loads applied in particular directions. Effective use of such reinforcement depends on the bond strength and bond durability with the polymer containing composition. The "fibrous reinforcement" may be separate component to or around which the polymer containing composition may be applied to improve the load bearing capacity of the article.

Such polymer-containing compositions may contain additional ingredients. Processing oil may be added to counteract any excessive viscosity and to improve belt flexibility. Tack increasing ingredients may be added to improve the green-state behavior and adhesion to the different structural components of the article such as the reinforcement. Antioxidants, anti-ozonants and other ingredients may be added to protect the article against chemical and thermo mechanical degradation.

Automotive belts are circulated around pulleys or rollers at high speed, with resulting high frequency, periodic loads sometimes at a wide range of low and high temperatures in the constrained space of an engine bay. An automotive belt may comprise a body of a polymer containing composition and a flexible, tension resistant fibrous reinforcement. The belt may be synchronous, in which case it has projections or ribs running normal to the longitudinal belt direction for engaging a pulley with a corresponding surface that enters into a driving relationship with the belt and prevents slippage. The belt may also be asynchronous, in which case the polymer based composition may form a longitudinally grooved surface to help engage the pulleys around which the belts circulate. Severe dynamic loading may occur. A pulley connected to the crankshaft drives a belt around a serpentine path around a number of idler pulleys and pulleys used to drive other automotive components such as pumps etc. The dynamic loading may comprise tension, compression, shear and torsional forces, sometimes applied at the same time, at frequencies upwards of up to 100 cycles per second. The belts may be known as "serpentine" or "asynchronous" or "micro-V belts". In any case, the green properties of the polymer used in making the polymer containing compositions are critical to the ease of manufacture and adhesion between the components of which the belts is made.

After shaping and curing of the article, a satisfactory balance of the following properties is desirable: a) strength to withstand the loads applied; b) flexibility to follow a serpentine path; c) resistance for the cured surface parts to cracking under the high frequency loads applied; d) stiffness and adhesion to transmit the forces from the belt exterior to the reinforcement; e) resistance to heat ageing, especially where the belt is used for an automotive engine and used at temperature in excess of 100° C., f) good abrasion resistance and low pilling for micro-V belts (the deposit of tiny abraded particles and reinforcing fibers from the belts on the pulleys they contact).

In the processing of the polymer-containing composition in the green state, automotive belts should preferably possess g) high self tack as measured by total energy. Successive layers that make up the belt can be firmly bonded together and/or good adhesion with the reinforcement can be achieved. Belt material in the form of sheets can be fitted around a mandrel and a durable a lap joint between the overlapping edges of the sheet results to provide a cylindrical piece of material which can be cut into endless hoops that can be subsequently processed into belts. Also desired is h) shapability before or after curing. The jointed material can be molded to form a shaped surface such as the micro-grooves and then subjected to a curing step. Alternatively the material can be cured first after the lap joint is formed and then micro-grooves may be created by grinding away as much as 30% of the total weight. Also desirable is i) rapid curing of polymer based composition, without undue deterioration of the polymer, to the desired cure state to lower production cost without deterioration of in the desired polymer properties.

For a grooved belt, longevity depends critically on the onset of crack formation and the propagation of fatigue cracks in the belt (which can be approximated by a flex crack resistance measurement) that leads to rib failure. Operation at elevated temperature in the engine bay may reduce belt life if the ageing resistance is insufficient and causes an undue deterioration in the above properties. In order to meet the preceding requirements the belt may have an appreciable width to allow for the progressive loss of physical properties increasing overall cost and engine bay dimensions.

The above performance requirements mentioned are often antagonistic in that changes in the polymeric composition to improve one performance aspect may harm another. Good tear resistance and flex crack resistance require a soft compound that has mechanical "give" while a high modulus is needed for stiffness and increased power density.

Belts have been produced in which ethylene propylene-based rubbers have been used in the polymer-based composition, including sulfur curable EPDM rubbers. More recently EP rubbers not containing dienes) have been used based on EP copolymers not containing any diene and the curing step to improve the stability at higher temperatures is effected using peroxide based curing systems. ExxonMobil Chemical Company has produced and recommended the use for belts of Vistalon V606 containing 54 wt % of units derived from ethylene with a Mooney Viscosity of 65; and Vistalon V707 containing 72 wt % with a Mooney Viscosity of 23. These polymers contain no diene. The composition is cured with peroxide curing using the well-known free radical mechanism. Such polymer based compositions lead to belts which have a low modulus, encouraging an intense curing step which may undermine the tear and flex crack resistance and lead to the use of wider belts with a lower power density.

Other polymers, such as polychoroprene have been used in belt applications that have improved oil resistance. Polychoroprene suffers relative to EP rubbers however in terms of the tear resistance and modulus and associated consequences.

EP 969 043 A (U.S. Pat. No. 6,288,171) discloses a thermoplastic vulcanizate composition comprising A) from 20 to 75 parts by weight of rubber which has been dynamically vulcanized in the presence of a rubber curative; B) from 25 to 80 parts by weight of a combination of 40 to 80 parts by weight of B1) a semi-crystalline polypropylene having a melting temperature of at least 120° C. and B2) 60 to 20 parts by weight of a random polypropylene copolymer having a peak melting temperature between 25° and 105° C. which is propylene-based elastomer. The blend is applied in a thermoplastic state with cured domains in a high melting point polypropylene matrix. The curing takes place during the process of mixing the blend components. Compositions of this type are said to be useful for making a variety of articles including belts but will have limited flexibility and flex crack resistance due to the presence of the semi-crystalline polypropylene component B1) in that application that forms a continuous phase.

U.S. Pat. No. 5,610,217, incorporated by reference for US purposes, discloses an elastomeric composition for incorporation in articles subject to dynamic loading, comprising an ethylene-alpha-olefin elastomer which is reinforced with filler and a coagent in the form of metal salt of an α-β-unsaturated organic acid. This composition is cured using a free-radical promoting material. U.S. Pat. No. 5,610,217 teaches generally that the elastomer comprises an ethylene-alpha-olefin elastomeric composition including copolymers composed of ethylene and propylene units (EPM), ethylene and butene units, ethylene and pentene units, or ethylene and octene units (EOM), and terpolymers composed of ethylene and propylene units and an unsaturated component (EPDM), as well as mixtures thereof. As the unsaturated component of EPDM, any appropriate non-conjugated diene may be used, including for example, 1,4-hexadiene, dicyclopentadiene or ethylidene norbornene (ENB). In a preferred embodiment, the ethylene-alpha-olefin elastomer contains from about 65% to about 75% of the ethylene unit. U.S. Pat. No. 5,610,217 contains no reference to the use of propylene-based elastomers having a low level of crystallinity derived from the presence of isotactic sequence of propylene.

EP 1 003 814 (WO 99/07788 and U.S. Pat. No. 6,525,157 and U.S. Pat. No. 6,635,715, incorporated herein by reference) describes the use of compositions comprising a first polymer semi-crystalline component and a second propylene-based elastomer polymer component which may comprise a copolymer. The compositions provide a good balance of stress versus extension and shows remarkable elastic properties. EP1003814 does not appear to suggest the use of the composition or its ingredient in articles exposed to dynamic loading. Production of a copolymer material of similar nature but using different types of single sited catalysts is described in WO2003/040201. The isotactic propylene sequences benefit adhesion and may lead to improved physical properties as compared to isotactic polypropylene blends with prior art ethylene propylene rubbers. There is no suggestion for the use the compositions for article such as belts subject to dynamic loading.

WO2005/049670 (US2005-0107534) and incorporated herein by reference describes a similar polymer but including dienes or otherwise treated to provide long chain branches and/or cross-linking. In so far as the test description of Definitions and Test Methods, paragraphs [0087] to [0111] are applicable to the discussions herein, they are incorporated by reference. WO2005/049670 refers to examples combining dine containing propylene-based elastomers with other carbon black as reinforcing filler and processing oil, see paragraph [00131] onwards. There is no suggestion for the use for articles such as belts subject to dynamic loading.

WO2000/69966 describes a barrier membrane comprising an isobutylene based polymer and a propylene-based elastomer. The membrane may be used in the manufacture of articles, preferably curable articles and/or vulcanizates, such tire inner liners, tire inner tubes, pharmaceutical stoppers, roof sheeting, belts, tubes, hoses, and so on. The barrier membrane may be used to prevent gas or fluid intrusion or leakage. There is no reference to the requirements and selections for meeting the demands of dynamic loading.

WO2002/051634 describes a composite structure comprising: (a) a first polymer structure made of an elastomeric material blended with from 5 to 50 phr (parts per hundred) of a semicrystalline random copolymer adhered to (b) a second polymer structure made of a blend of a dynamically vulcanized elastomeric material dispersed in a matrix of a thermoplastic polyolefin polymer. The material is used in of glass run channels, door seals, belt line seals, insulation, roof seals, trunk seals and hood seals not subject to dynamic loading.

Co-pending applications such as PCT/US2005/034946 describe end uses for polymer blends made in dual reactor operation. Ethylene, alpha-olefin, vinyl norbornene elastomers are described in U.S. Pat. No. 5,698,650, which refers to use in vehicle brake parts and power transmission belts. The portions of that patent describing the elastomers, their properties, and methods for making them, are hereby incorporated by reference for purposes of U.S. patent practice.

The present invention seeks to provide a composition for dynamically-loaded articles with an improved balance of longevity and power density while balancing crack resistance, stiffness and tear resistance and ease of manufacture.

DESCRIPTION

Figure 1:
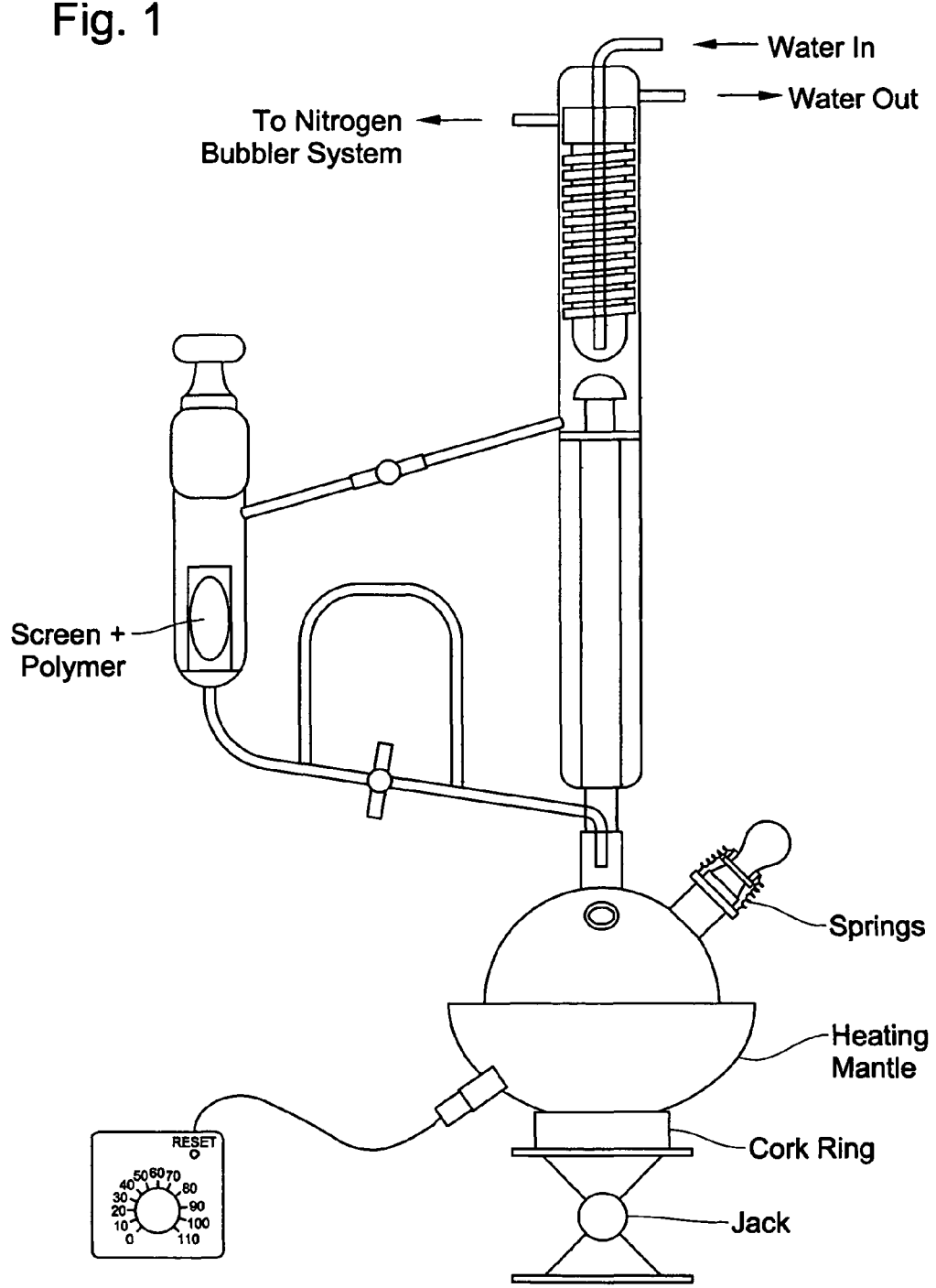
FIG. 1 is a schematic representation of a Soxhlet extraction apparatus as is referred to in paragraph [0060]

In a first aspect, disclosed herein is a manufacturing process comprising the features of claim 1. A desired modulus can be achieved at a relatively low cure state and with a relatively soft compound. A stiffer article can be made at a high cure state if needed; a softer compound with a good tear and abrasion resistance can still have sufficient modulus. Improved power densities and/or longevities may be obtained. It is believed that the use of the propylene elastomer (which term is used herein interchangeably with the term "propylene-based elastomer") provides a shift in the balance between stiffness and strength that enables a softer material to accommodate higher loads without undue deterioration of other properties desirable for such articles. The amounts of the polymeric component are indicated in phr, which is used herein in the description and claims to indicate parts per hundred parts of rubber. The amount of rubber refers to propylene-based elastomer together with any polymeric adjuvants but excluding processing oils, that can be extracted, and filler, and other additives.

The shaping step in the green state may be performed by a number of techniques. These may include conventional shaping techniques for shaping and vulcanizing elastomeric articles, such as extrusion or shaping around a mandrel. Heating may be employed to decrease the viscosity to temperatures below that at which the curing package is fully triggered. Compositions may be formulated which in the green state are less viscous and capable of being shaped by techniques not conventionally employed for these types of articles such injection molding. Shaping steps during or following curing are discussed later on.

The term "continuous phase" includes any polymeric components that are occluded within that continuous phase and the weight of any such occlusions forms part of the total weight of the polymeric component. In determining the total weight of the continuous polymeric component, filler present in that component is excluded. The composition preferably has a continuous polymer phase comprising at least 40 wt % based on the total weight of the polymeric component formed at least in part by the propylene elastomer. Suitably the polymeric component comprises at least 60 wt %, especially at least 60 wt %, or at least 80 wt % or even 90 wt % or more of the propylene elastomer.

Other polymeric components may be admixed. Such adjuvants may form the balance of the total polymeric component present. The adjuvants may be intimately mixed with the propylene-based elastomer and not recognizable as a separate phase or may be present in a separate phase. There are several methods for assessing the microstructural properties of the component including the identification of the matrix or continuous phase, size and distribution of filler particles as well as curatives. These methods are commonly practiced and are known to one skilled in the art, they include optical microscopy, electron microscopy in conjunction with $RuO_4$ or $OsO_4$ staining, atomic force microscopy (AFM) and Time-of-Flight Secondary Ion Mass Spectrometry (ToF-SIMS). All require an internal surface to be exposed preferably by cryogenic microtoming and then imaged/analyzed using one of the aforementioned techniques.

The propylene-based elastomer has isotactic triad tacticity indicating a sufficient presence of stereoregular inserted propylene derived units. The triads and sequences with more than three propylene derived units in stereoregular form contribute to the heat of fusion, which reflects the formation of crystallites from stereoregular propylene-based sequences. The total crystallinity provided by the propylene-based elastomer and any polymeric adjuvant influences the flexibility of the cured article. The crystallinity of the propylene-based elastomer is selected to provide an overall composition having the desired cured flexibility. If the heat of fusion exceeds 70 J/g the article tends to be too stiff.

The isotactic triad tacticity of the propylene elastomer ranges from 50 to 99%. As defined herein, this percentage is based on the total amount of propylene-based triads of all steric configuration in the polymer and ignores the presence of units derived from monomers other than propylene. If the triad tacticity is less than 50%, the effect of the isotactic triad tacticity is outweighed by the influence of other triads and the propylene-based elastomer may not have the desired strength/elongation behavior. There may be insufficient potential for the progressive crystallization of the polymer. If the triad tacticity exceeds 99 wt % and the heat of fusion is less than 70 J/g, the polymer contains high levels of units derived from comonomers other than propylene and the desired elastomer behavior cannot be achieved.

The propylene-based elastomer may optionally contain a diene. The diene may be used to intensify the curing step by speeding it or achieving a higher final cure state in the case of curatives such as peroxide containing curatives, which can also function without diene being present in the propylene-based elastomer.

The propylene-based elastomer should have a molecular weight, preferably expressed in units Mooney (Mooney Viscosity (Ml(1+4)@125° C.)), which is sufficient to withstand any scissioning of the polymer chain that may occur during curing, and to provide, together with other components of the composition, a viscosity appropriate to the chosen shaping technique.

The polymer containing composition includes a reinforcing filler component to increase the flexural modulus and provide other overall properties (viscosity, etc.) desirable for dynamically-loaded articles. The amount can be selected. Too little reinforcing filler and the polymer containing composition may be too fluid and not be able to achieve the desired power density; too much and the article may be too stiff.

The curative is admixed and triggered in the curing step to achieve the desired cure state. Different options are set out below. Peroxides are preferred, especially those having a 1 minute half-life less than 185° C., preferably less than 175° C., and most preferably less than 155° C.

In the process, the polymer containing composition may comprise polymeric adjuvant. These may be present in amounts and be of a type leading it to be miscible with the propylene elastomer and be undetectable as a separate phase or it may form a separate phase from that consisting predominantly of the propylene elastomer. Full miscibility is encouraged by low or no crystallinity, use in small amounts, lower molecular weights and/or compatible crystallinity. The adjuvants may have isotactic polypropylene type crystallinity. The composition optionally contains from 1 to 20 wt %, preferably 2 to 10 wt %, based on the total weight of the polymer component of an isotactic semicrystalline polypropylene having a heat of fusion of more than 70 J/g. The composition may contain less than 10 wt % of a polypropylene having a heat of fusion of above 90 J/g in the green state and/or may have a Mooney Viscosity ML(1+4)@125° C. of from 15 to 65, and preferably from 20 to 40, especially less than 30. The polymer which is admixed may be a polypropylene homopolymer, a copolymer containing less than 10 wt % of comonomer derived units, most preferably ethylene or butene derived units. The presence of other comonomers in the propylene elastomer and adjuvant polymers such as the presence of units derived from $C_4$, $C_6$, $C_8$ alpha-olefins, may influence the extent of formation of a separate phase. The polymer may also contain an ethylene-based copolymer, which has some ethylenic crystallinity. The curing effect may differ as between different polymers present and influence the phase formation. The polymeric adjuvants may be separately polymerized and blended in or may be produced in a series or parallel reactor and formed as a reactor blend with the propylene elastomer.

Where the composition is a homogeneous or heterogeneous multi-phase polymer blend, the composition may be prepared in the green state by blending separately produced polymers, optionally at the same time as the filler and curative are admixed. The blend may also be produced as a reactor blend by the use of multiple catalysts and/or multiple polymerization reactors, arranged to combine the reactor effluents before the polymer is finished into solid form, whether pellet or bale. Methods for producing reactor blends comprising propylene-base elastomers are described in co-pending applications WO1999/07788; WO1999/45049; U.S. Ser. No. 60/618,301 filed 13 Oct. 2004 and related U.S. Ser. No. 60/645,138 filed 20 Jan. 2005; U.S. Ser. No. 60/649,074 filed 31 Jan. 2005; U.S. Ser. No. 60/648,968 filed 31 Jan. 2005 all incorporated herein by reference for US purposes.

The composition overall may have a heat of fusion from 3 to 75 J/g, preferably less than 70 J/g. Advantageously, in the process of the invention, the composition in the green state has a Mooney Viscosity 125° C.(1+4) of from 20 to 80, and preferably from 25 to 50 The self tack may be measured by the total energy to peel apart the two surfaces of the green compound and advantageously should be >0.2 J, especially >0.5 J and preferably >1 J. The uncured composition may have a green strength as measured by the 10% modulus of from 0.8 to 10 MPa, preferably 1.4 to 8 MPa. The green strength of the compound preferably exceeds, for the 10% modulus, values of 1 MPa, a stress at break of >4 MPa and a strain at break of >300%. Suitably the cured composition has a cure state of from 5 to 60 dNm and a 10% modulus from 0.7 to 10 MPa and preferably a cure state of 10 to 30 dNm and a 10% modulus of from 5 to 10 MPa. The cured composition should have a flex crack growth rate less than $5 \times 10^{-5}$ mm/cycle, preferably less than $1 \times 10^{-5}$ mm/cycle and a hot tear @ 125° C. of >15 N/mm and more preferably >24 N/mm.

The curative may further comprise at least one co-agent for forming reversible ionic links or for forming covalent bonds between chains for improving the tear resistance.

Propylene elastomers not containing diene are preferred over propylene elastomers containing diene as elastomers for dynamically-loaded systems such as belts which need to retain the necessary physical properties for the life of the belt while operating in an elevated temperature environment. The absence of diene residues in the polymer aids the thermal stability. The peroxide cure system permits curing in the absence of diene derived units in the polymer. Where the operating environment of a belt is at a much lower temperature, such that the presence of diene residues would not undermine the useful life of the belt, peroxide may still provide advantages in cure state and reduced loss in the belt made with a diene containing elastomer in comparison to belts made with diene containing elastomer that is cured with sulfur based cure systems.

If dienes are present, the elastomer may contain from 0.1 to 8 wt % of diene derived comonomer units for promoting curing and the cure state as determined by ODR @ 170° C., 30 min MH-ML is from 20 to 50 dNm. This is similar to polymers that do not contain diene. The presence of diene can assist in the increased 10% modulus as well as other physical properties such as flex crack resistance. The amount of the polyene present in the polymeric components can be inferred by the quantitative measure of the amount of the pendent free olefin present in the polymer after polymerization. Several procedures such as iodine number and the determination of the olefin content by $^1$H or $^{13}$C NMR have been established. In the particular case where the polyene is ENB the amount of polyene present in the polymers can be measured using ASTM D6047. The amount of polyene present is expressed on the basis of the total weight of (for example) polyene, ethylene, and propylene derived units. In the case of VNB, the amount can be determined by the same procedure outline in ASTM D6047 with the difference being instead of measuring the absorbance peak associated with ENB at 1685-1690 cm$^{-1}$ the absorbance peak at 1635-1640 cm$^{-1}$ assigned to VNB is used. If the propylene elastomer contains substantially no unsaturated moieties, the cure state may be preferably from 20 to 50 dNm.

The diene-derived units optionally present in the propylene-based elastomer may be derived from any hydrocarbon structure having at least two unsaturated bonds wherein at least one of the unsaturated bonds may be incorporated into a polymer. The dienes may be selected to provide two ethylenically polymerizable bonds in which case polymerization may result in a level of long chain branch formation (VNB is an example of such a diene recited below). The dienes may also be selected to have only a single ethylenically polymerizable bond that assists in chain incorporation and restrict polymerization at the other active location (ENB is an example of such a diene below). Non-limiting examples of preferred polyenes include 5-ethylidene-2-norbornene ("ENB"), 5-vinyl-2-norbornene ("VNB"), divinyl benzene ("DVB"), and dicyclopentadiene ("DCPD"). VNB is more active in peroxide curing; ENB is more active in sulfur curing.

The reinforcing filler component may comprise carbon black, silica, talc or reinforcing fibers, carbon fibers or nanoclay distributed through a continuous polymer phase. Naturally mixtures of these are also included. The compositions described herein may contain inorganic particulate fillers, which may improve the mechanical and wear properties of the compositions. The amount of inorganic filler used is preferably 50-90 phr. The inorganic fillers may include particles less than 1 mm in diameter, rods less than 1 cm in length, and plates less than 0.2 cm$^2$ in surface area. Exemplary particulate fillers include carbon black, clays, titanium and magnesium oxides, and silica. In addition, other particulate fillers, such as calcium carbonate, zinc oxide, whiting, and magnesium oxide, can also be used. An example of a rod-like filler is glass fiber. An example of a plate-like filler is mica. The addition of very small particulate fibers, commonly referred to as nanocomposites, is also contemplated. The addition of the fillers may change the properties of the compositions described herein. For example, compositions including inorganic filler may have improved thermal stability and resistance to wear. The addition of white fillers may improve the temperature changes of the hydrocarbon polymers on exposure to sunlight. The addition of fillers beyond a certain level may lead to a dramatic increase in the viscosity and a corresponding decrease in processability. This threshold level is referred to as the percolation threshold. In addition to the increase in viscosity, the percolation threshold is accompanied by an improvement in the elastic properties, and at levels slightly higher than the percolation threshold there is a drop in the elastic recovery of the blend. The percolation threshold is attained at different levels of addition of fillers depending on the type of filler used. Generally, the percolation threshold is attained at lower levels for fillers with a smaller size than for fillers with a larger size.

Details of Propylene-Based Elastomer

The propylene-based elastomer may be selected from any elastomer meeting the requirements of low heat of fusion and high triad tacticity. The propylene-based elastomeric polymers are generally produced by random polymerization processes leading to polymers having randomly distributed irregularities in stereoregular propylene propagation. This is in contrast to block copolymers in which constituent parts of the same polymer chains are separately and sequentially polymerized. The term "elastomeric polymer" indicates that the heat of fusion of the polymer as determined by DSC is less than 70 J/g. Generally then the peak melting point as determined by DSC will be below 105° C. but the elastomers may contain a portion which provide a higher melting point fraction. This is in contrast to propylene copolymers or atactic polymers containing propylene derived units, which lack recovery from elastic deformation.

The polymer is "propylene-based" in the sense that the amount of propylene in the polymer is sufficient to allow stereoregular propylene sequences to crystallize and give rise to a detectable heat of fusion. This is in contrast with known elastomeric polymers based on ethylene and propylene in which the heat of fusion can be attributed to ethylene derived polymer sequences. Preferably the polymers contain isotactic propylene sequences, separated by stereo or regio error or by one or more units from a comonomer.

The polymers and compositions described herein can be characterized in terms of their melting points (Tm) and heats of fusion, which properties can be influenced by the presence of comonomers or steric irregularities that hinder the formation of crystallites by the polymer chains. The heat of fusion preferably ranges from a lower limit of 1.0 J/g, or 1.5 J/g, or 3.0 J/g, or 4.0 J/g, or 6.0 J/g, or 7.0 J/g, to an upper limit of 30 J/g, or 40 J/g, or 50 J/g, or 60 J/g. Here and every where else any lower range end may be combined with an upper range end to provide alternative ranges. If the heat of fusion is too high, the polymer may not extend elastically under a sufficiently low force for elastic deformation and have insufficient elastic elongation. If the heat of fusion is too low the polymer may not show a sufficient return force after elastic deformation. The heat of fusion can be reduced by using additional comonomer, higher polymerization temperatures and/or a different catalyst providing reduced levels of steric constraints and favoring more propagation errors for propylene insertion. The melting point of the propylene-based elastomer is preferably ≦105° C., more preferably ≦100° C., more preferably ≦90° C., and in some embodiments ≦80° C. or ≦75° C. The properties can be determined by Differential Scanning Calorimetry (DSC), using the ASTM E-794-95 (version E-794-01) procedure. The samples to be prepared for DSC testing are preferably pressed at 200-230° C. to form a sheet, which is then removed from the press and allow to stand at room temperature (23-25° C.) for about 24 hours. Samples (6-10 mg) for DSC analysis are removed with a punch die.

The term "tacticity" refers to the stereoregularity of the orientation of the methyl residues from propylene in a polymer. The term "isotactic" as in isotactic polypropylene is defined herein as a polymer sequence in which greater than 50% of the pairs of pendant methyl groups located on adjacent propylene units, which are inserted into the chain in a regio regular 1,2 fashion and are not part of the backbone structure, are located either above or below the atoms in the backbone chain, when such atoms in the backbone chain are all in one plane. Pairs of methyl residues from contiguous propylene units identically inserted which have the same orientation with respect to the polymer backbone are termed "meso" (m). Those of opposite configuration are termed "racemic" (r). When three adjacent propylene groups have methyl groups with the same orientation, the tacticity of the triad is 'mm'. If two adjacent monomers in a three-monomer sequence have the same orientation, and that orientation is different from the relative configuration of the third unit, the tacticity of the triad is 'mr'. When the middle monomer unit has an opposite configuration from either neighbor, the triad has 'rr' tacticity. The fraction of each type of triad in the polymer can be determined and, when multiplied by 100, indicates the percentage of that type found in the polymer and is referred to herein as the triad tacticity. The "triad tacticity" of the polymers described herein can be determined from a $^{13}C$ nuclear magnetic resonance (NMR) spectrum of the polymer as described in U.S. Pat. No. 5,504,172, and U.S. Pat. No. 6,642,316, column 6, lines 38 through column 9, line 18, which patents are hereby incorporated by reference in their entirety. The propylene-based elastomer suitably has an isotactic triad fraction of 65% to 99% and more especially of 70% to 98%. The propylene-based elastomer may have an isotactic triad fraction of 75% to 97%.

The propylene-based elastomer also has tacticity index, expressed herein as "m/r", is determined by $^{13}C$ nuclear magnetic resonance (NMR). The tacticity index m/r is calculated as defined in H. N. Cheng, Macromolecules, 17, 1950 (1984). An m/r ratio of 1.0 generally describes a syndiotactic polymer, and an m/r ratio of 2.0 generally describes an atactic material. An isotactic material theoretically may have a ratio approaching infinity, and many by-product atactic polymers have sufficient isotactic content to result in ratios of greater than 50. The tacticity index reflects the stereoregularity in the polymer.

The triad tacticity and tacticity index may be controlled by the catalyst influencing the stereoregularity of propylene placement, the polymerization temperature according to which stereoregularity can be reduced by increasing the temperature and by the type and amount of a comonomer which tends to disrupt reduce the level of longer propylene derived sequences as described in more detail in WO2005/49670. Preferably the polymer contains at least some comonomer, such as an alpha-olefin, in order to facilitate control of the structure. Preferably, the comonomer comprises substantially ethylene which can aid in achieving economic polymerization conditions by raising the molecular weight and/or permitting a raising of the polymerization temperature.

The propylene-based elastomer described herein is a polymer of propylene-derived units and optionally one or more units derived from a $C_2$ or $C_4$-$C_{20}$ α-olefin. Generally the amount of the ethylene or alpha-olefin combined varies from 5 to 35 wt %, preferably from 10 to 25 wt % and especially from 12 to 20 wt %. Preferred α-olefins are ethylene, butene, hexene and octene or combinations thereof as the propylene-based elastomer may contain more than more alpha-olefin. The total weight percent of the $C_2$ or $C_4$-$C_{20}$ α-olefin-derived units is preferably from about 5 wt % to about 35 wt %, more preferably from about 7 wt % to about 32 wt %, more preferably from about 8 wt % to about 25 wt %, more preferably from about 8 wt % to about 20 wt %, and more preferably from about 8 wt % to about 16 wt %. Particular embodiments of polymers having more than one α-olefin include propylene-ethylene-octene, propylene-ethylene-hexene and propylene-ethylene-butene polymers. These polymers may further comprise a diene as described below. In some embodiments, where more than one comonomer is present, the amount of a particular α-olefin comonomer may be <5 wt %, but the combined α-olefin comonomer content is preferably >5 wt %. Where ethylene forms the principal or only comonomer, generally the amount of the ethylene or α-olefin combined varies from 5 to 35 mol %, preferably from 8 to 25 weight percent, more preferably 10 to 20 wt %. Too much comonomer will reduce the crystallinity provided by the crystallization of stereoregular propylene derived sequences to the point where the material lacks elastic recovery; too little and the material will be too crystalline, have a high melting point and be insufficiently elastic.

The comonomer content and sequence distribution of the polymers can be measured using $^{13}C$ nuclear magnetic resonance (NMR) by methods well known to those skilled in the art and as described in detail in WO2005/49670.

The propylene-based elastomers may be prepared using process and catalyst options as set out in WO2005/49670. The active transition metal complex is preferably of a single site type, including metallocene, heteroligand (pyridinal) based options. The crystallinity of the propylene-based elastomer can be reduced also by stereo-irregular incorporation of the propylene-derived units, which can be influenced by, for example, the choice of catalyst and polymerization temperature. The low crystallinity polymers can be made by the continuous solution polymerization process described in W02002134795, optionally in a single reactor and separated by liquid phase separation from the alkane solvent. The low crystallinity polymers of the present invention can be produced in the presence of a chiral metallocene catalyst with an activator and optional scavenger. The use of single site catalysts can be used to enhance the homogeneity of the low crystallinity polymer. As only a limited tacticity is needed many different forms of single site catalyst may be used. Possible single site catalysts are metallocenes, such as those described in U.S. Pat. No. 5,026,798, which have a single cyclopentadienyl ring, optionally substituted and/or forming part of a polycyclic structure, and a hetero-atom, generally a nitrogen atom, but possibly also a phosphorus atom or phenoxy group connected to a group 4 transition metal, such as titanium, zirconium, or hafnium. A further example is Me5CpTiMe3 activated with B(CF)3 as used to produce elastomeric polypropylene with an Mn of up to 4 million. See Sassmannshausen, Bochmann, Rosch, Lilge, J, Organomet. Chem. (1997), vol 548, pp. 23-28. Other possible single site catalysts are metallocenes which are bis cyclopentadienyl derivatives having a group transition metal, such as hafnium or zirconium. Such metallocenes may be unbridged as in U.S. Pat. No. 4,522,982 or U.S. Pat. No. 5,747,621. The metallocene may be adapted for producing the low crystallinity polymer comprising predominantly propylene derived units as in U.S. Pat. No. 5,969,070 which uses an unbridged bis-(2-phenyl indenyl) zirconium dichloride to produce a homogeneous polymer having a melting point of above 79° C. The cyclopentadienyl rings may be substituted and/or part of polycyclic systems as described in the above U.S. Patents. Other possible metallocenes include those in which the two cyclopentadienyls are connected through a bridge, generally a single atom bridge such as a silicon or carbon atom with a choice of groups to occupy the two remaining valencies. Such metallocenes are described in U.S. Pat. No. 6,048,950 which discloses bis(indenyl)bis(dimethylsilyl) zirconium dichloride and MAO; WO 98127154 which discloses a dimethylsilyl bridged bis-indenyl hafnium dimethyl together with a non-coordinating anion activator; EP1070087 which discloses a bridged biscyclopentadienyl catalyst which has elements of asymmetry between the two cyclopentadienyl ligands to give a polymer with elastic properties; and the metallocenes described in U.S. Pat. Nos. 6,448,358 and 6,265,212. Pyridine amide based single site catalysts are described in WO2003/040201

The manner of activation of the single site catalyst can vary. Alumoxane, such as methyl alumoxane, may be used. Higher molecular weights may be obtained using non-or weakly coordinating anion activators NCA) derived and generated in any of the ways amply described in published patent art such as EP277004, EP426637, and many others. Activation generally is believed to involve abstraction of an anionic group such as the methyl group to form a metallocene cation, although according to some literature zwitterions may be produced. The NCA precursor may be an ion pair of a borate or aluminate in which the precursor cation is eliminated upon activation in some manner, e.g. trityl or ammonium derivatives of tetrakis pentafluorophenyl boron (See EP277004). The NCA precursor may be a neutral compound such as a borane, which is formed into a cation by the abstraction of and incorporation of the anionic group abstracted from the metallocene (See EP426638). In a particular embodiment, the catalyst system used to produce the propylene-based elastomer includes one or more transition metal compounds and one or more activators. When alumoxane or aluminum alkyl activators are used, the combined pre-catalyst-to-activator molar ratio is generally from 1:5000 to 10:1. When ionizing activators are used, the combined pre-catalyst-to-activator molar ratio is generally from 10:1 to 1:10. Multiple activators may be used, including using mixtures of alumoxanes or aluminum alkyls with ionizing activators. In another embodiment, the propylene-based elastomer is made in the presence of an activating cocatalyst which is a precursor ionic compound comprising a halogenated tetra-aryl-substituted Group 13 anion wherein each aryl substituent contains at least two cyclic aromatic rings. In a particular aspect of this embodiment, the propylene-based elastomer contains greater than 0.2 parts per million, or greater than 0.5 parts per million, or greater than 1 part per million, or greater than 5 parts per million of the residues of the activating cocatalyst. For example the catalyst system used to produce the propylene-based elastomer may be Hf-containing metallocene catalyst, such as but not limited to dimethyl silyl bis(indenyl)hafnium dimethyl, and a non-coordinating anion activator, such as but not limited to dimethyl anilinium tetrakis(heptafluoronaphthyl)borate.

The propylene-based elastomer may possess varying molecular weight distributions and degrees of long chain branching which influence the melt processability and can be selected together with reinforcing filler content, processing oil etc. to provide the desired processability prior to curing.

Details of Other Additive Options

The composition may contain a processing oil, preferably in the form of a poly-alpha-olefin and/or an adhesion promoter that increases the total energy of the composition. The compositions described herein may contain process oil in the range of from 0 to 500 parts by weight, or from 2 to 200 parts by weight, or from 5 to 150 parts by weight, or from 10 to 100 parts by weight, per 100 parts of polymer. The addition of process oil in moderate amounts may lower the viscosity and flexibility of the blend while improving the properties of the blend at temperatures near and below 0° C. It is believed that these potential benefits arise by the lowering of the glass transition temperature (Tg) of the blend. Adding process oil to the blend may also improve processability and provide a better balance of elastic and tensile strength. The process oil is typically known as extender oil in rubber applications. Process oils include hydrocarbons having either (a) traces of hetero atoms such oxygen or (b) at least one hetero atom such as dioctyl phthalate, ethers, and polyethers. Process oils have a boiling point so as to have substantially no volatility at 200° C.

These process oils are commonly available either as neat solids, liquids, or as physically absorbed mixtures of these materials on an inert support (e.g., clay, silica) to form a free flowing powder. Process oils usually include a mixture of a large number of chemical compounds which may consist of linear, acyclic but branched, cyclic, and aromatic carbonaceous structures. Another family of process oils include certain organic esters and alkyl ether esters having a molecular weight (Mn) less than 10,000. Combinations of process oils may also be used in the practice of the invention. The process oils are suitably be compatible or miscible with the polymer blend composition in the melt, and may be substantially miscible in the propylene-based elastomer at room temperature. The soxhlet extraction procedure below can be used for extracting oil from neat polymers as well as compounds and determining the amount of oil extracted. The procedure is as follows:

a) Accurately weigh a 0.5 g (±0.02 g) sample of polymer/compound that is to be extracted and a small piece of fine mesh screen to the fourth decimal and record their weights. Place the polymer/compound sample on the center of the screen and sandwich the polymer and screen between two sheets of Mylar and place in a heated press (125-140° C.) and apply a force of approximately 15 tons for ~15 seconds.

b) Remove the sample from the press, peel off the mylar and allow to cool to room temperature and then weigh the screen/polymer sample to the fourth decimal and record. The sample now consists of the polymer/compound embedded in the mesh from the press.

c) Add 1000 ml of MEK and a few boiling chips to the round-bottom reactor. Set up extraction device as shown in FIG. 1. Turn on water to condenser and nitrogen to bubbler system. Set Variac controller for the heating mantle to approximately 60. Place folded polymer/screen sample in the extraction cup of the device. Replace lid of extraction cup.

d) Extract for 30-120 minutes with refluxing MEK. Adjust, if necessary, the refluxing rate with the Variac control so that the distilled quantity of solvent fills and dumps at least ten times.

e) After the desired refluxing time, reduce the heating, remove the screen and dry in the vacuum oven at 105° C. for 15 minutes. Remove from the oven and cool to ambient temperature for 5 minutes. Weight the polymer/screen to the fourth decimal and record.

Process oils may be added to the blend compositions by any of the conventional means known in the art, including the addition of all or part of the process oil prior to recovery of the polymer, and addition of all or part of the process oil to the polymer as a part of a compounding for the interblending of the propylene-based elastomer. The compounding step may be carried out in a batch mixer, such as a mill, or an internal mixer, such as a Banbury mixer. The compounding operation may also be conducted in a continuous process, such as a twin screw extruder. The addition of process oils to lower the glass transition temperature of blends of isotactic polypropylene and ethylene propylene diene rubber is described in U.S. Pat. Nos. 5,290,886 and 5,397,832, the disclosures of which are hereby incorporated herein by reference for US purposes. The addition of process aids, such as a mixture of fatty acid ester or calcium fatty acid soap bound on a mineral filler, to the compositions described herein may help the mixing of the composition and the injection of the composition into a mold.

Other examples of process aids are low molecular weight polyethylene copolymer wax and paraffin wax. The amount of process aid used may be within the range of from 0.1 to 5 phr.

The addition of process aids, such as a mixture of fatty acid ester or calcium fatty acid soap bound on a mineral filler, to the compositions described herein may help the mixing of the composition and the injection of the composition into a mold. Other examples of process aids are low molecular weight polyethylene copolymer wax and paraffin wax. The amount of process aid used may be within the range of from 0.1 to 5 phr. Tack improving additives or adhesion promoters may be added. These include hydrocarbon resins and functionally modified resins including but not limited to Escorez® and Ricobond® resins.

Adding antioxidants to the compositions described herein may improve the long term aging. Examples of antioxidants include, but are not limited to quinolein, e.g., trimethylhydroxyquinolein (TMQ); imidazole, e.g., zinc mercapto toluyl imidazole (ZMTI); and conventional antioxidants, such as hindered phenols, lactones, and phosphites. The amount of antioxidants used may be within the range of from 0.001 to 5 phr.

Details of Supplementary Polymer Options

Apart form the polymeric adjuvant mentioned previously, other polymer components that may be included comprise an elastomeric ethylene based copolymer with an alpha-olefin having from 3 to 10 carbon atoms and a density of from 0.85 to 0.91, a chlorinated ethylene based polymer, and/or an ethylene based polymer with oxygen containing moieties having a crystallinity of less than 80 J/g. The amounts may be adjusted to achieve a desired effect such as oil resistance. Such further polymeric options are part of the total polymeric composition.

Overall Composition Properties

Using the process of the invention polymer containing composition may be prepared in which the uncured polymer based component has a green strength as measured by the 10% modulus of from 0.8 to 12 MPa, preferably 1 to 10 MPa, a strain at break of >300%, and the total energy is at least 0.20 Joules to provide green tack. The green strength provides good processability, reduced scrap rates and relatively low viscosity compositions can be obtained permitting injection molding. The green composition can have good tack providing a good bond with any reinforcement and reducing reliance on bond enhancing special treatments.

Preparation of Polymer Containing Composition in Green State

The compositions described herein may be prepared by any procedure that provides an intimate mixture of the polymeric components. Generally, the first step of the process is mixing the polymeric components (which may be presented separately or in previously mixed form such as a reactor blend or series reactor product) and optional additives of the types discussed above, such as process oil, fillers, colorants, antioxidants, nucleators, and flow improvers using equipment such as, but not limited to a Carver press for melt pressing the components together, internal mixers such as a Banbury mixer or a Brabender mixer for solution or melt blending of the components, and equipment used for continuous mixing procedures including single and twin screw extruders, static mixers, impingement mixers, as well as other machines and processes designed to disperse the components in intimate contact.

Sufficient intermixing of the polymeric components is indicated by the uniformity of the morphology of the composition. Such procedures are well known to those of ordinary skill in the art. In one embodiment, the next step may be mixing the curative component, such as peroxides or sulfur compounds, with the intimate mixture, and then fabricating the intimate mixture including the chemical curative into the desired final shape of the article.

The shaped article can then be cured and cross-linked by raising the temperature for a period of time to allow the curing of the propylene-based elastomer. The curing systems that may be used in the practice of the invention is preferably mixed into the propylene-based elastomer, or the blend comprising the elastomer, prior to the shaping step of the article to be made.

The cure state results from the combination of process factors and the ingredients of the polymer containing composition. If too high the article become to stiff and prone to cracking and tearing. If too low the strength at higher operating temperatures may be compromised.

Other Structural Components

The article may be reinforced by other structural elements not fully dispersed in a polymer containing composition matrix. The reinforcement may be a belt-reinforcement in the form of a fibrous web, fabric or filament bundle in the green state. The composition may be applied directly to the reinforcement. For such belts the belt may be shaped by forming it around a mandrel with a joint at facing edges; and ribs are formed in the belt in the direction of movement of the belt by a molding step in the uncured condition or by grinding grooves in the cured state. The cured polymer based compositions may have under Demattia testing conditions a crack length of less than 15 mm at room temperature over 90K cycles, preferably 10 mm, more preferably 7 and most preferably 4 mm.

Belting compounds made using propylene-based elastomers containing diene derived units capable of reacting with a peroxide curing agent and metallic co-agent have been found to exhibit significant improvements in crack resistance, and especially a low rate of growth of any cracks formed, compared to a currently commercialized peroxide cured belting composition using ethylene propylene derived interpolymers.

Cured Properties

The cured composition may have a 10% modulus of 0.7 to 10 MPa, preferably 1.4 to 9 MPa and most preferably 2 to 8 MPa; a tear Resistance at 125° C. of 15 to 60 N/mm, preferably 20 to 60 N/mm and most preferably 25 to 60 N/mm; an ageing performance as determined the change in Shore A hardness of $\leq 5$ after Heat Aging—168 hr @ 125° C. and/or under Demattia testing conditions, a Crack Length at 90 k Cycles (CL@90 k) as measured in mm, and the 10% Modulus (10% M) as measured in MPa complying with the inequality CL@90 k<(5×10% M)+10, preferably CL@90 k<(5×10% M)+5 and most preferably CL@90 k<(5×10% M)+3.

The invention also relates, in another aspect to a polymer based composition for use in the manufacture of an belt, said composition comprising (a) a continuous phase of a polymeric component of at least 15 wt % based on the total weight of the polymer component of a propylene elastomer having a heat of fusion of less than 70 J/g, an isotactic triad tacticity of 50 to 99% and optionally containing units derived from a diene and an MFR of from 0.5 to 50 g/10 min, and having an MFR of from 0.5 to 50 g/10 min, said polymeric component having a density of less than 0.9 and (b) from 20 to 120 phr, preferably 30 to 100 phr, most preferably 40 to 90 phr based on the total weight of the polymer component of a non-fibrous reinforcing filler component; and (c) a peroxide curative and (d) optionally a processing oil and/or adhesion promoter. The composition may have optional and preferred features set out previously in the context of the process of the invention in connection with the green state of the composition used in the process.

In yet another aspect of the invention, there is provided a belt for subjecting to dynamic loading obtained by curing step after combination of uncured polymer based composition and a reinforcement, said article comprising (a) a continuous phase of a polymeric component of at least 15 wt % based on the total weight of the polymer component of a propylene elastomer having a heat of fusion of less than 70 J/g, an isotactic triad tacticity of 50 to 99% and optionally containing units derived from a diene and an MFR of from 0.5 to 50 g/10 min, said polymeric component having a density of less than 0.9 and (b) from 20 to 120 phr, preferably 30 to 100 phr, most preferably 40 to 90 phr based on the total weight of the polymer component of a non-fibrous reinforcing filler component; and (c) a peroxide curative and (d) optionally a processing oil and/or adhesion promoter, said composition having a Demattia crack length of less than 15 mm at room temperature over 90K cycles. The belt may have the optional and preferred features previously set out in connection with the cured article produced by the process of the invention. The belt may be in the form of a micro-V-belt.

In yet another aspect of the invention, the invention relates to the use or method for using the propylene-based elastomer in belt manufacture to produce the various beneficial effects in processing and ultimate belt performance mentioned previously and especially flex crack resistance at a reasonable modulus.

EXAMPLES

To the extent that the examples use a propylene elastomer not containing any diene derived units or residues, they are commercially available under the trade name Vistamaxx™ from ExxonMobil Chemical Company. To the extent the Examples use propylene elastomers containing dienes they are prepared using the methods described in PCT publication WO2005/049670 with appropriate adjustment to obtain the stated diene contents for the propylene-based elastomers.

The table below list the physical properties and ASTM methods that were used to measure those properties:

| Physical Property | ASTM Method |
|---|---|
| Cure State | D2084-01 |
| Mooney Viscosity & Scorch | D1646-00 |
| 10% Modulus | D412-98a |
| Stress @ Break | D412-98a |
| Strain @ Break | D412-98a |
| Green strength | D412-98a |
| Die C Tear—Tear Resistance | D624-00 |
| DeMattia Flex crack resistance | D813-95 |

The following are the methods used to measure tack or self adhesion between two pieces of compound.

a) Pads 20.3×20.3 cm (8×8 in.) of compound are molded (100° C. for 2 minutes) into sheets ~2 mm thick. The pads are separated by clean mylar sheets to ensure that that no contamination of the surfaces occur and that they remain prestine. The samples are allowed to relax for a minimum of 24 hrs. Cut samples from the molded sheet using a 2.5×15 cm (1×6 in.) rectangular die. A total of 6 strips are required for each sample, allowing for 3 samples to be prepared for self tack. Remove the mylar film from one side of the strip and bring the two exposed surface of 2 strips together, aligning the sides carefully. Ensure that a small piece of mylar ~3.8×5.0 cm (1.5×2.0 in.) is inserted piece at the end of each 2.5×15 cm strip, this will form the tabs that go into the Instron. Roll the laminate three times with the 454 g (1 lb.) hand roller, allowing only the weight of the roller to exert the pressure (no added hand force). Use the same speed of rolling and time between laminating, rolling, and testing for all samples of a given series.

b) Using a tensile tester such as an Instron or MTS place the end tabs of the sample in the grips of the unit, close the grips. The configuration of the sample is now a 180° T-peel specimen. Peel the sample apart at room temperature and at cross-head speed of 5.1 cm (2 in.) per minute recording the entire Force-Displacement curve which will be a 10.1 cm (4 in.) displacement. Record the peak force and calculate the total energy required to peel the two surfaces apart through integrating the area under the Force-Displacement curve.

Polymer Containing Compound:

The compound includes components from Table 1. These can be used in the typical amounts indicated in Table 1 independently of each other. Actual amounts used for the specific Examples are set out in the Table 4 below.

TABLE 1

| Ingredient | Typical amounts | Comment |
|---|---|---|
| Polymer | 100 phr | |
| Carbon Black N330 HAF obtained from Cabot | 50-100 phr | Reinforcing filler |
| Hi-Sil 233 obtained from PPG | 20 phr | Reinforcing hydrated amorphous silica filler |
| Sunpar 2280 Oil obtained from Sunoco | 10 phr | Process oil with 67% paraffinic character, the remainder is naphthenic |
| Elevast PAO 40 available from ExxonMobil Chemical Company | 10 phr | Branched 100% paraffinic process oil |
| Struktol WD212 obtained from Struktol | 2-4 phr | Processing and dispersing aid |
| Luperox F40 obtained from Arkema | 2-6 phr | High temperature peroxide cure agent (1 minute half life approx 180° C.) |

TABLE 1-continued

| Ingredient | Typical amounts | Comment |
|---|---|---|
| Varox 802-40KE obtained from R.T.Vanderbilt | 5-15 phr | Reduced temperature peroxide cure agent (1 minute half life approx 180° C.) |
| Varox 231 XL obtained from R.T.Vanderbilt | 5-15 phr | Low temperature peroxide curing agent (1 minute half life 152° C.) |
| Coagent-SR 634 obtained from Sartomear | 3-24 phr | Zinc acrylate for ionic linking of chains |
| Coagent-SR 350 obtained from Sartomear | 3-24 phr | TMPTMA |
| Agerite Q Resin TMQ obtained from Akrochem | 1 phr | Ageing stabilizer |

Please note that phr refers to parts per hundred parts of polymer (rubber), defined herein the total of the polymeric component.

The compounds used different polymers whose main properties are set out in Table 2.

TABLE 2

|  | Ethylene content | Heat of fusion by DSC (J/g) | ENB (wt %) |
|---|---|---|---|
| Vistalon ™ 706 (V706) obtained from ExxonMobil Chemical Company, having a Mooney Viscosity (ML (1 + 4) 125° C.) of 42 | 65 wt % | 23.5 | 0 |
| Polychloroprene |  |  | 0 |
| Vistamaxx ™ 6100 (VM 6100) having a MFR of 3 | 16.4 wt % | 6.3 | 0 |
| Vistamaxx ™ 3000 (VM 3000) having a MFR of 8 | 10.9 wt % | 30.4 | 0 |
| VMDX-A having a MFR of 3.6 | 15.9 wt % | 7.3 | 2.0 |
| VMDX-B having a MFR of 3.8 | 13 wt % | 22.3 | 2.0 |
| VMDX-C having a MFR of 4.1 | 11.2 wt % | 32.4 | 2.1 |
| Escorene PP 3155 isotactic polypropylene having an MFR of 35 and a heat of fusion of 100 J/g |  |  |  |
| Blend 1 (85 wt % VMDX A-20 wt % Escorene PP 3155) |  |  |  |
| Blend 2 (95 wt % VM 6100 + 5 wt % isotactic polypropylene) having an MFR of 3, an overall ethylene content of 15.5 wt % and a heat of fusion of 7.3 |  |  |  |

Heat of fusion is determined after 24 hours annealing (by removing the sample from the press and leaving the sample to stand at room temperature (23-25° C./50% humidity). The MFR was determined by ASTM-D1238 230° C., 2.16 kg.

The components were blended into compounds in a 1.6 liter Banbury mixer and milled on a 2 Roll Mill following standard rubber processing procedures. The ingredients were blended as follows in the 1.6 liter Banbury mixer:

TABLE 3

| Rotor speed — | 80 rpm |
|---|---|
| Ram Pressure— | 60 psi (410 kPa) |
| At start 0— | Add Polymer |
| After 30 sec— | Add Filler, Agerite and Oil |
| After 90 sec— | Sweep |
| Dump contents | At 300° F. (148° C.) for 4 min |
| Roll mill-refine | Add peroxide at room temperature (23-25° C.). |

The ingredients were mixed in the following proportions for 5 test runs, cured as set out in Table 4 and tested:

TABLE 4

| Ingredient | EPDM (V706) | CR[1] | S-1 VMDX-A | S-2 VMDX-B | S-3 VMDX-C | S-4 VM-6100 | S-5 VM-3000 | S-6 VMDX-A | S-7 VM-6100 | S-8 Blend 1 |
|---|---|---|---|---|---|---|---|---|---|---|
| Polymer | 100 | 100 | 100 | 100 | 100 | 100 | 100 | 100 | 100 | 100 |
| N330 HAF | 50 |  | 50 | 50 | 50 | 50 | 50 | 50 | 50 | 50 |
| N550 |  | 45 |  |  |  |  |  |  |  |  |
| Sunpar 2280 | 10 |  | 10 | 10 | 10 | 10 | 10 | 10 | 10 | 10 |
| Aromatic Oil |  | 4 |  |  |  |  |  |  |  |  |
| Varox 802-40KE | 5 |  | 5 | 5 | 5 |  |  |  |  |  |

TABLE 4-continued

| Ingredient | | | | | | | | | | |
|---|---|---|---|---|---|---|---|---|---|---|
| Varox 231-XL | | | | | | 12 | 12 | 15 | 15 | 4.25 |
| SR634 | 15 | | 15 | 15 | 15 | 15 | 15 | 15 | 15 | 12.75 |
| Agite Resin D TMQ | 1 | | 1 | 1 | 1 | 1 | 1 | 1 | 1 | 1 |
| Agerite HP-S (AO) | | 2 | | | | | | | | |
| Maglite-D MgO | | 4 | | | | | | | | |
| Kadox 930 ZnO | | 5 | | | | | | | | |
| Stearic Acid | | 2 | | | | | | | | |
| DOP[2] | | 6 | | | | | | | | |
| Total PHR | 181 | 168 | 181 | 181 | 181 | 188 | 188 | 191 | 191 | 178 |

| Ingredient | S-9 Blend 2 | S-10 VMDX-A | S-11 VMDX-A | S-12 VMDX-A | S-13 VMDX-A | S-14 VMDX-A | S-15 VMDX-A | S-16 VMDX-A | S-17 VM-6100 |
|---|---|---|---|---|---|---|---|---|---|
| Polymer | 100 | 100 | 100 | 100 | 100 | 100 | 100 | 100 | 100 |
| N330 HAF | 50 | 55 | 65 | 75 | 85 | 55 | 65 | 55 | 85 |
| N550 | | | | | | | | | |
| Sunpar 2280 Aromatic Oil | 10 | 10 | 10 | 10 | 10 | 10 | 10 | 10 | 10 |
| Varox 802-40KE | | 5 | 5 | 5 | 5 | 5 | 5 | 8 | 15 |
| Varox 231-XL | 11.40 | | | | | | | | |
| SR634 | 14.25 | 15 | 15 | 15 | 15 | 24 | 24 | 24 | 15 |
| Agite Resin D TMQ | 1 | 1 | 1 | 1 | 1 | 1 | 1 | 1 | 1 |
| Agerite HP-S (AO) | | | | | | | | | |
| Maglite-D MgO | | | | | | | | | |
| Kadox 930 ZnO | | | | | | | | | |
| Stearic Acid | | | | | | | | | |
| DOP[2] | | | | | | | | | |
| Total PHR | 186.65 | 186 | 196 | 206 | 216 | 195 | 205 | 198 | 226 |

[1]CR = Polychloroprene
[2]DOP = Dioctyl Phthalate

The cure conditions were selected to avoid over-curing, which can be avoided either adapting the diene level and level of peroxide curing agent. Examples of Vistalon™ 706 and Polychloroprene are comparative. The compounds were cured under the following conditions under the conditions indicated in Table 4. The compounds were tested in the green state before curing and in the cured condition for the properties shown in Tables 5A to 5D.

TABLE 5A

| Measured Property | | S-1 EPDM (V706) | S-2 CR | S-1 VMDX-A | S-2 VMDX-B | S-3 VMDX-C | S-4 VM-6100 | S-5 VM-3000 | S-6 VMDX-A | S-7 VM-6100 | S-8 Blend 1 |
|---|---|---|---|---|---|---|---|---|---|---|---|
| Cure Conditions | | 180° C.@ 20 min | | 160° C.@ 60 min | 160° C.@ 60 min | 160° C.@ 60 min | 160° C.@ 2.5 min | 160° C.@ 2.5 min | 160° C.@ 2.5 min | 160° C.@ 2.5 min | 160° C.@ 60 min |
| ML (1 + 4) @ 125° C. | MU | 61.5 | 53.8 | 27.7 | 28.2 | 26.5 | 36.7 | 22.6 | 35.5 | 38 | Init 219.3 |
| Mooney Scorch, MS @ 132° C. t5 | min | 16.9 | 17.5 | 50.7 | 54.5 | 59.4 | 3.3 | 4.2 | 3.3 | 3.1 | 45.2 |
| ODR @ 170° C., 30 min MH-ML | dNm | 107.6 | 113.5 | 29.8 | 28.5 | 24.2 | 30.4 | 18.0 | 38.5 | 31.6 | 15.6 |
| t90 | Min. | 13.9 | 12.0 | 18.1 | 17.5 | 17.1 | 1.3 | 1.6 | 1.7 | 1.3 | 16.3 |
| Rate | dNm/min | 29.4 | 35.0 | 10.1 | 9.1 | 8.7 | 43.1 | 24.0 | 41.9 | 45.6 | 5.0 |
| Rubber Tensile Test | | | | | | | | | | | |
| Hardness | Shore A | 74 | 70 | 64 | 90 | 95 | 68 | 95 | 65 | 70 | 90 |
| Mod 10% | MPa | 1.27 | 0.84 | 0.78 | 3.54 | 6.32 | 0.96 | 5.85 | 0.73 | 1.06 | 4.50 |
| Mod 20% | MPa | 1.81 | 1.31 | 1.06 | 4.36 | 7.13 | 1.33 | 6.87 | 1.10 | 1.46 | 6.16 |
| Mod 50% | MPa | 2.58 | 2.36 | 1.54 | 5.05 | 7.36 | 1.89 | 7.37 | 1.85 | 2.16 | 8.45 |
| Mod 100% | MPa | 3.73 | 4.85 | 2.23 | 6.17 | 8.31 | 2.74 | 8.34 | 3.25 | 3.26 | 10.38 |
| Stress @ Break | MPa | 20.98 | 23.04 | 14.87 | 15.70 | 19.80 | 15.31 | 18.63 | 14.85 | 14.12 | 14.01 |
| Strain @ Break | % | 393 | 381 | 524 | 368 | 455 | 617 | 528 | 401 | 535 | 258 |

TABLE 5B

| | S-9 | S-10 | S-11 | S-12 | S-13 | S-14 | S-15 | S-16 | S-17 |
|---|---|---|---|---|---|---|---|---|---|
| Measured Property | Blend 2 | VMDX-A | VMDX-A | VMDX-A | VMDX-A | VMDX-A | VMDX-A | VMDX-A | VM-6100 |
| Cure Conditions | 160° C.@ 2.5 min | 160° C.@ 60 min | 160° C.@ 60 min | 160° C.@ 60 min | 160° C.@ 60 min | 160° C.@ 60 min | 160° C.@ 60 min | 160° C.@ 60 min | 160° C.@ 2.5 min |

TABLE 5B-continued

|  |  | S-9 | S-10 | S-11 | S-12 | S-13 | S-14 | S-15 | S-16 | S-17 |
|---|---|---|---|---|---|---|---|---|---|---|
| ML (1 + 4) @ 125° C. | MU | 48.8 | 34.1 | 42 | 27.6 | 27.7 | 33.5 | 42.5 | 33.3 | 58.4 |
| Mooney Scorch, MS @ 132° C. t5 | min | 3.9 | 36.1 | 35.7 | 49.7 | 50.0 | 54.3 | 49.3 | 34.5 | 2.57 |
| ODR @ 170° C., 30 min MH-ML | dNm | 23.6 | 29.5 | 32.4 | 31.7 | 33.1 | 35.6 | 36.7 | 53.3 | 37.0 |
| t90 | Min. | 1.6 | 17.5 | 17.2 | 18.2 | 17.6 | 16.5 | 15.8 | 17.1 | 1.4 |
| Rate | dNm/min | 29.7 | 9.0 | 9.8 | 9.8 | 10.2 | 10.8 | 11.6 | 14.5 | 54.7 |
| Rubber Tensile Test |  |  |  |  |  |  |  |  |  |  |
| Hardness | Shore A | 83 | 65 | 70 | 65 | 65 | 70 | 73 | 70 | 78 |
| Mod 10% | MPa | 2.22 | 0.81 | 1.07 | 0.82 | 0.85 | 1.13 | 1.34 | 1.05 | 1.43 |
| Mod 20% | MPa | 2.95 | 1.12 | 1.46 | 1.13 | 1.16 | 1.50 | 1.75 | 1.46 | 1.92 |
| Mod 50% | MPa | 4.01 | 1.57 | 2.02 | 1.57 | 1.61 | 2.09 | 2.37 | 2.28 | 2.81 |
| Mod 100% | MPa | 5.27 | 2.46 | 3.10 | 2.32 | 2.46 | 3.14 | 3.62 | 3.83 | 4.53 |
| Stress @ Break | MPa | 14.57 | 14.64 | 14.86 | 15.95 | 15.20 | 14.13 | 14.54 | 13.47 | 15.59 |
| Strain @ Break | % | 531 | 506 | 479 | 572 | 506 | 489 | 448 | 364 | 418 |

TABLE 5C

|  |  | S-1 | S-2 | S-3 | S-4 | S-5 | S-6 | S-7 | S-8 |
|---|---|---|---|---|---|---|---|---|---|
| Measured Property | | EPDM (V706) | CR | VMDX-A | VMDX-B | VMDX-C | VM-6100 | VM-3000 | VMDX-A | VM-6100 | Blend 1 |
| Cure Conditions | | 180° C.@ 20 min | | 160° C.@ 60 min | 160° C.@ 60 min | 160° C.@ 60 min | 160° C.@ 2.5 min | 160° C. @ 2.5 min | 160° C.@ 2.5 min | 160° C.@ 2.5 min | 160° C.@ 60 min |
| Green Strength Cure—100° C.@2 min |  |  |  |  |  |  |  |  |  |  |
| Mod 10% | [MPa] | 0.83 | 0.42 | 0.85 | 2.29 | 3.93 | 1.02 | 3.77 | 0.81 | 1.23 | 3.44 |
| Mod 20% | [MPa] | 1.31 | 0.55 | 1.04 | 2.62 | 4.39 | 1.19 | 4.25 | 0.98 | 1.41 | 4.81 |
| Mod 50% | [MPa] | 1.91 | 0.64 | 0.64 | 2.81 | 4.49 | 1.32 | 4.39 | 1.13 | 1.56 | 6.97 |
| Mod 100% | [MPa] | 1.95 | 0.62 | 1.24 | 2.97 | 4.57 | 1.38 | 4.41 | 1.17 | 1.64 | 8.87 |
| Stress @ Peak | [MPa] | 2.01 | 2.77 | 9.32 | 14.17 | 16.14 | 9.25 | 15.22 | 8.72 | 10.22 | 10.88 |
| Strain @ Break | [%] | 75 | 906 | 937 | 767 | 708 | 956 | 768 | 961 | 922 | 277 |
| Self Tack/T-Peel—Green Compound |  |  |  |  |  |  |  |  |  |  |
| Peak Load | [N] | 1.40 | 29.02 | 31.62 | 4.26 | No Tack | 51.32 | 3.42 | 36.98 | 37.57 | 12.48 |
| Total Energy | (J) | 0.12 | 2.22 | 1.80 | 0.47 | 0.01 | 4.13 | 0.12 | 2.96 | 2.58 | 1.13 |
| Heat Aging 168 hr @ 125° C. |  |  |  |  |  |  |  |  |  |  |
| Change in Hardness | Shore A | 4 | 18 | 4 | 0 | −2 | 2 | 0 | 5 | 1 | 0 |
| Change in Mod 10% | [%] | 8.7 | 243.1 | 12.0 | −4.5 | 3.8 | 17.9 | 8.7 | 38.2 | 3.5 | 0.3 |
| Change in Tensile | [%] | 1.9 | −21.1 | −0.2 | 7.7 | −2.5 | −21.0 | −13.1 | 3.2 | −5.4 | 0.5 |
| Change in Elongation | [%] | −3.1 | −71.4 | −7.0 | 12.7 | −12.8 | −15.9 | −14.0 | −8.6 | −15.2 | −12.3 |
| Die C Tear Resist @ RT | [N/mm] | 47.03 | 40.41 | 34.1 | 52.2 | 60.4 | 43.0 | 65.3 | 30.23 | 39.74 | 49.17 |
| Die C Tear Resist @ 125° C. | [N/mm] | 20.01 | 16.38 | 19.8 | 19.3 | 17.0 | 18.5 | 10.2 | 11.85 | 19.24 | 15.36 |
| DeMattia Crack Resistance @ RT 5 Hz @ 300% |  |  |  |  |  |  |  |  |  |  |
| Average Crack Length @ 90k Cycles | [mm] | 17.5 | 15.2 | 3.3 | 9.7 | 16.3 | 2.9 | 24.5 | 4.9 | 4.0 | 18.9 |
| Crack Growth Rate/Cycle | [mm/cycle] | 19.49e−5 | 16.89e−5 | 3.33e−5 | 10.81e−5 | 18.11e−5 | 3.22e−5 | 27.22e−5 | 5.44e−5 | 4.42e−5 | 20.96e−5 |
| Average Crack Length | [mm] | 25.4 | 19.8 | 5.4 | 12.6 | 23.8 | 3.6 | 24.5 | 6.4 | 4.0 | 25.4 |
| No. of Cycles | k-cycles | 1746 | 1412 | 1412 | 1412 | 1265 | 522 | 522 | 1412 | 1774 | 1412 |

TABLE 5D

|  |  | S-9 | S-10 | S-11 | S-12 | S-13 | S-14 | S-15 | S-16 | S-17 |
|---|---|---|---|---|---|---|---|---|---|---|
| Measured Property | | Blend 2 | VMDX-A | VMDX-A | VMDX-A | VMDX-A | VMDX-A | VMDX-A | VMDX-A | VM-6100 |
| Cure Conditions | | 160° C. @ 2.5 min | 160° C. @ 60 min | 160° C. @ 60 min | 160° C.@ 60 min | 160° C.@ 60 min | 160° C.@ 60 min | 160° C.@ 60 min | 160° C.@ 60 min | 160° C. @ 2.5 min |
| Green Strength Cure—100° C.@2 min |  |  |  |  |  |  |  |  |  |  |
| Mod 10% | [MPa] | 2.06 | 1.24 | 1.38 | 1.04 | 0.94 | 1.27 | 1.41 | 1.20 | 1.24 |
| Mod 20% | [MPa] | 2.58 | 1.47 | 1.62 | 1.23 | 1.12 | 1.50 | 1.63 | 1.41 | 1.49 |
| Mod 50% | [MPa] | 3.32 | 1.71 | 1.84 | 1.39 | 1.29 | 1.70 | 1.83 | 1.58 | 1.68 |

TABLE 5D-continued

|  |  | S-9 | S-10 | S-11 | S-12 | S-13 | S-14 | S-15 | S-16 | S-17 |
|---|---|---|---|---|---|---|---|---|---|---|
| Mod 100% | [MPa] | 3.80 | 1.84 | 1.97 | 1.44 | 1.34 | 1.79 | 1.92 | 1.65 | 1.76 |
| Stress @ Peak | [MPa] | 11.01 | 10.65 | 10.01 | 9.99 | 10.01 | 9.76 | 8.78 | 9.07 | 10.17 |
| Strain @ Break | [%] | 976 | 911 | 885 | 941 | 937 | 883 | 868 | 883 | 995 |
| Self Tack/T-Peel—Green Compound | | | | | | | | | | |
| Peak Load | [N] | 21.36 | 8.45 | 16.47 | 30.99 | 29.50 | 16.99 | 14.18 | 14.29 | 34.39 |
| Total Energy | (J) | 0.87 | 0.55 | 1.22 | 2.21 | 2.14 | 0.96 | 0.89 | 0.98 | — |
| Heat Aging—168 hr @ 125° C. | | | | | | | | | | |
| Change in Hardness | Shore A | −1 | 5 | 7 | 2 | 3 | 5 | 6 | 7 | 1 |
| Change in Mod 10% | [%] | −14.4 | 35.2 | 28.0 | 9.6 | 7.9 | 16.0 | 18.3 | 30.5 | 5.5 |
| Change in Tensile | [%] | −4.7 | 0.8 | −2.5 | −3.8 | −1.7 | −3.4 | −8.0 | 0.6 | −15.2 |
| Change in Elongation | [%] | −10.8 | −4.8 | −10.7 | −16.0 | −3.4 | −3.2 | −13.7 | −7.0 | −18.6 |
| Die C Tear Resist @ RT | [N/mm] | 49.40 | 38.35 | 37.91 | 34.68 | 35.04 | 41.64 | 41.78 | 36.29 | 36.12 |
| Die C Tear Resist @ 125° C. | [N/mm] | 25.53 | 18.64 | 26.97 | 17.41 | 19.43 | 20.86 | 28.42 | 14.98 | 27.43 |
| DeMattia Crack Resistance 5 Hz @ 300% | | | | | | | | | | |
| Average Crack Length @ 90k Cycles | [mm] | 6.6 | 3.3 | 7.8 | 3.7 | 3.3 | 4.0 | 6.2 | 10.8 | 4.8 |
| Crack Growth Rate/Cycle | [mm/cycle] | 7.30e−5 | 3.67e−5 | 8.61e−5 | 4.15e−5 | 3.67e−5 | 4.44e−5 | 6.83e−5 | 11.94e−5 | 5.37e−5 |
| Average Crack Length | [mm] | 6.6 | 3.7 | 8.5 | 4.8 | 4.3 | 8.6 | 11.1 | 18.2 | 4.8 |
| No. of Cycles | k-cycles | 522 | 1746 | 1746 | 1412 | 1412 | 1746 | 1746 | 1746 | 1774 |

The compounds of the invention generally provide better resistance to crack growth exceeding the comparative Examples. In the examples V706 and Polychloroprene reflect polymers and polymer compositions currently used in demanding belt applications. S1/S2/S3 show the effect of ethylene content with differing VMDX grades at 16%, 13%, 10% at constant MFR (3.6) and ENB content (2.0%). S4/S5 illustrate the effect of ethylene content on diene-free Vistamaxx™ elastomer grades—VM-6100 (16%) and VM-3000 (11%). S1/S6 show the effect of different peroxide levels on VMDX—802 vs 231 XL. S4/S7 show the 231 XL level (12 phr vs 15 phr) on the Vistamaxx™ elastomer S1/S8 illustrate the effect of isotactic polypropylene at a 15 wt % level; S4/S9 show that effect at a 5% level on Blend 2. S1/S10, S11, S12, and S13 show the effect of the carbon Black content (50, 55, 65, 75, 85) on VMDX formulations. S1/S14, S15 show the effect of a higher coagent level and carbon black level on VMDX. S1/S16 show the impact of higher coagent content and peroxide level on VMDX containing formulations. Finally, comparison of S7 and S17 show the effect of higher carbon black loadings on the performance of VM-6100.

Figure 2:
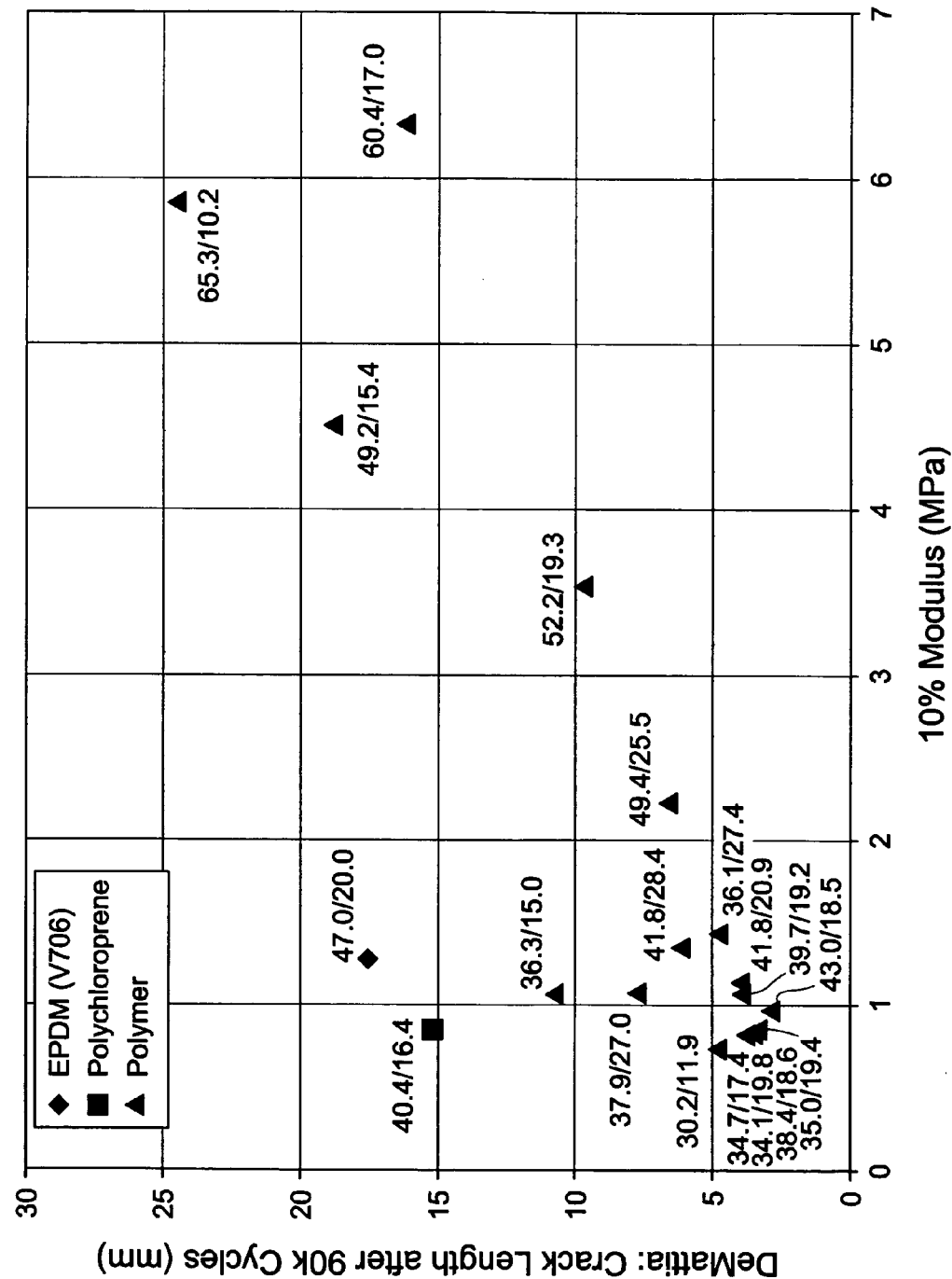
FIG. 2 is a graph showing variations of the DeMattia Crack Length with the modulus as indicated in the Examples, with "polymer" referring the polymer compositions of the invention.
Figure 3:
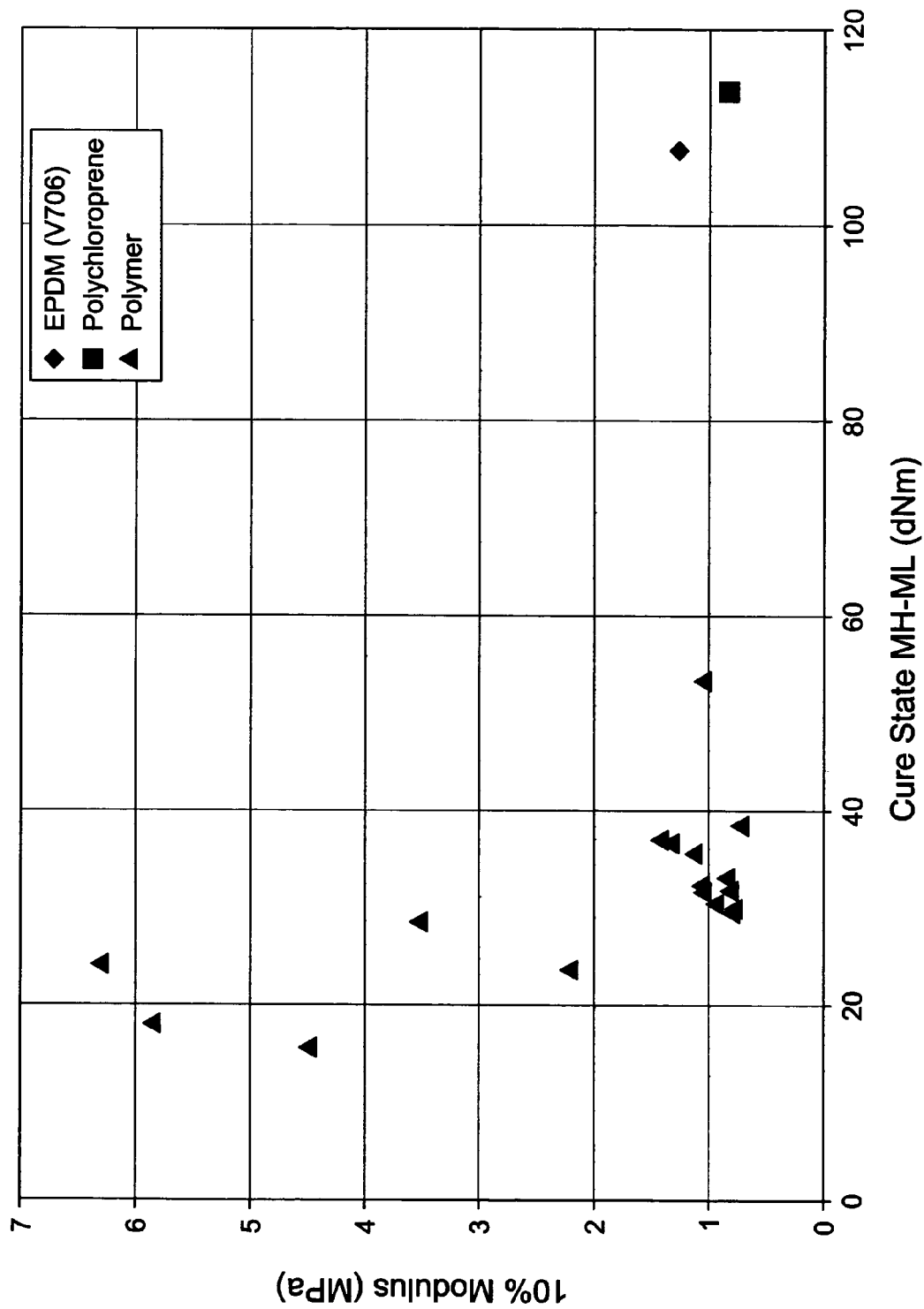
FIG. 3 is a graph showing variations of the modulus with cure state in the Examples.

FIG. 2 shows the Crack Growth at 90,000 cycles versus 10% Modulus for V706, CR and the 17 examples. The numbers assigned to each individual data point represent the Die C Tear at Room Temperature (left number) and at 125° C. (right number). FIG. 3 shows the Cure State (MH-ML) vs 10% Modulus for V706, CR and the 17 examples.

We claim:

1. A process for making an article for subjecting to dynamic loading comprising:
   (i) shaping a polymer-containing composition in the green state, the composition comprising:
      (a) a continuous phase of a polymeric component comprising at least 15 wt % based on the total weight of the polymer component of a propylene elastomer comprising from about 5 to about 35 wt % units derived from ethylene and having a heat of fusion of less than 70 J/g and an isotactic triad tacticity of 50 to 99% and optionally containing units derived from a diene, the polymeric component having a density of less than 0.9 g/cm$^3$;
      (b) a reinforcing filler component in an amount of from 20 to 120 phr based on the total weight of the polymer component;
      (c) a peroxide curative and
      (d) a fibrous reinforcement; and
   (ii) curing the shaped composition to a cure state as determined by ODR @ 170° C., 30 min. MH-ML of from 5 to 80 dNm.

2. A process according to claim 1 wherein the curative comprises at least one co-agent for forming reversible ionic links or for forming covalent bonds between chains for improving the crack resistance.

3. A process according to claim 1 wherein the composition comprises a polymeric adjuvant that is an olefin-based polymer different from the propylene elastomer.

4. A process according to claim 2 wherein the composition comprises a polymeric adjuvant that is an olefin-based polymer different from the propylene elastomer.

5. A process according to claim 1 wherein the composition has an overall heat of fusion of from 3 to 75 J/g.

6. A process according to claim 1 further comprising ≦20 wt % based on the total weight of the polymer component of an isotactic semicrystalline polypropylene having a heat of fusion of more than 70 J/g.

7. A process according to claim 6 further comprising ≦10 wt % based on the total weight of the polymer component of an isotactic semicrystalline polypropylene having a heat of fusion of more than 70 J/g.

8. A process according to claim 1 wherein the cured composition has a cure state of from 5 to 60 dNm and a 10% modulus of from 0.7 to 10 MPa.

9. A process according to claim 8 wherein the cured composition has a cure state of from 10 to 30 and a 10% modulus of from 5 to 10 MPa.

10. A process according to claim 1 wherein the peroxide 1 minute half life is less than 185° C.

11. A process according to claim 1 wherein the composition comprises less than 10 wt % of a polypropylene having a heat of fusion of above 90 J/g in the green state and has a Mooney ML(1+4)@125° C. of from 15 to 65.

12. A process according to claim 1 wherein the propylene elastomer comprises from 0.1 to 8 wt % of diene-derived comonomer units for promoting curing and the cure state as determined by ODR @ 170° C., 30 min MH-ML is from 20 to 50 dNm or wherein the polymer comprises substantially no unsaturated moieties and the cure state as determined by ODR @ 170° C., 30 min MH-ML is from 20 to 50 dNm.

13. A process according to claim 1 wherein the reinforcing filler component comprises carbon black, silica, talc or a reinforcing fiber distributed through a continuous polymer phase.

14. A process according to claim 13 wherein the reinforcing fiber is a carbon fiber or nano-clay distributed through a continuous polymer phase.

15. A process according to claim 1 wherein the polymeric component further comprises less than 30 phr of a processing oil.

16. A process according to claim 15 wherein the processing oil is a poly-alpha-olefin and/or an adhesion promoter.

17. A process according to claim 1 wherein the propylene elastomer has a heat of fusion of from 3 to 40 J/g as measured by DSC, and/or an MFR of from 0.5 to 50 g/10 min.

18. A process according to claim 1 wherein the polymeric component further comprises an elastomeric ethylene-based copolymer with an alpha-olefin having from 3 to 10 carbon atoms and a density of from 0.85 to 0.91 g/cm$^3$, a chlorinated ethylene-based polymer, and/or an ethylene-based polymer with oxygen-containing moieties having a crystallinity of less than 80 J/g.

19. A process according to claim 1 wherein the uncured composition has a green strength as measured by the 10% modulus of from 0.8 to 10 MPa.

20. A process according to claim 1 wherein the article is a belt and the fibrous reinforcement is the form of a fibrous web, fabric or filament bundle in the green state.

21. A process according to claim 20 wherein the polymer containing composition is applied directly to the fibrous reinforcement.

22. A process according to claim 20 wherein the belt is shaped by forming it around a mandrel with a joint at facing edges; and ribs are formed in the belt in the direction of movement of the belt by a molding step in the uncured condition or by grinding grooves in the cured state.

23. A process according to claim 21 wherein the belt is shaped by forming it around a mandrel with a joint at facing edges; and ribs are formed in the belt in the direction of movement of the belt by a molding step in the uncured condition or by grinding grooves in the cured state.

24. A process according to claim 1 wherein the cured polymer containing composition has, under Demattia testing conditions, a crack length of less than 15 mm at room temperature over 90K cycles.

25. A process according to claim 1 wherein the cured polymer containing composition has a 10% modulus of 0.7 to 10 MPa.

26. A process according to claim 1 wherein the cured polymer containing composition has Tear Resistance at 125° C. of 15 to 60 N/mm.

27. A process according to claim 1 wherein the cured polymer containing composition has an ageing performance as determined the change in Shore A hardness of $\leq 5$ after Heat Aging −168 hr @ 125° C.

28. A process according claim 1 wherein the cured polymer has, under Demattia testing conditions, a Crack Length at 90 k Cycles (CL@90 k) as measured in mm, and the 10% Modulus (10% M) as measured in MPa complying with the inequality CL@90 k<(5×10% M)+10.

* * * * *